US009760154B2

(12) United States Patent
Jun et al.

(10) Patent No.: US 9,760,154 B2
(45) Date of Patent: Sep. 12, 2017

(54) METHOD OF DYNAMICALLY CONTROLLING POWER IN MULTICORE ENVIRONMENT

(71) Applicant: Electronics and Telecommunications Research Institute, Daejeon (KR)

(72) Inventors: Sung Ik Jun, Daejeon (KR); Baik Song An, Yuseong (KR); Jin Ho On, Jeonju (KR); Young Choon Woo, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 377 days.

(21) Appl. No.: 14/264,214

(22) Filed: Apr. 29, 2014

(65) Prior Publication Data
US 2015/0160714 A1 Jun. 11, 2015

(30) Foreign Application Priority Data
Dec. 10, 2013 (KR) .................. 10-2013-0153123

(51) Int. Cl.
*G06F 1/32* (2006.01)

(52) U.S. Cl.
CPC ............ *G06F 1/324* (2013.01); *G06F 1/3206* (2013.01); *Y02B 60/1217* (2013.01)

(58) Field of Classification Search
None
See application file for complete search history.

(56) References Cited

U.S. PATENT DOCUMENTS

| 5,825,674 A * | 10/1998 | Jackson ................. G06F 1/206 712/E9.032 |
| 7,111,179 B1 * | 9/2006 | Girson ................. G06F 1/3203 320/130 |
| 2003/0206068 A1 * | 11/2003 | Wong ....................... G06F 1/08 331/57 |
| 2005/0210309 A1 * | 9/2005 | Tang ..................... G06F 9/4411 713/600 |

(Continued)

FOREIGN PATENT DOCUMENTS

KR 10-2010-0026989 3/2010
KR 10-2011-0043193 4/2011

(Continued)

*Primary Examiner* — Kim Huynh
*Assistant Examiner* — Danny Chan
(74) *Attorney, Agent, or Firm* — Staas & Halsey LLP

(57) ABSTRACT

Provided is a method of dynamically controlling power in a multicore environment including a multicore processor which includes a plurality of cores and a scheduler. The method includes determining whether a management policy is set, collecting frequency change information used to change frequencies of the plurality of cores when it is determined that the management policy is set, calculating an average load of each core on a basis of the frequency change information, calculating an average frequency of each core according to the calculated average load of each core, comparing the average frequency of each core and a predetermined threshold value, and setting a next frequency of each core according to the comparison result.

14 Claims, 6 Drawing Sheets

(56) References Cited

U.S. PATENT DOCUMENTS

| | | |
|---|---|---|
| 2010/0058086 A1 | 3/2010 | Lee |
| 2011/0022857 A1* | 1/2011 | Nussbaum ............ G06F 1/3203 713/300 |
| 2011/0025128 A1* | 2/2011 | Burchard ............. G06F 1/3203 307/31 |
| 2011/0093724 A1 | 4/2011 | Park et al. |
| 2011/0173617 A1* | 7/2011 | Gargash ............... G06F 1/3203 718/100 |
| 2012/0079290 A1 | 3/2012 | Kumar et al. |
| 2012/0131356 A1 | 5/2012 | Han |
| 2012/0185709 A1* | 7/2012 | Weissmann .................. 713/320 |
| 2013/0007475 A1* | 1/2013 | Ganesan ................ G06F 1/324 713/300 |
| 2013/0097453 A1 | 4/2013 | Choi et al. |
| 2013/0151879 A1* | 6/2013 | Thomson ............... G06F 1/329 713/322 |
| 2013/0185570 A1 | 7/2013 | Kumar et al. |
| 2013/0227326 A1* | 8/2013 | Gwak .................. G06F 1/3287 713/324 |
| 2014/0149779 A1* | 5/2014 | Allen-Ware .......... G06F 1/3206 713/340 |
| 2014/0181538 A1* | 6/2014 | Shrall ....................... G06F 3/14 713/300 |
| 2014/0195829 A1* | 7/2014 | Bhandaru ................ G06F 1/26 713/300 |
| 2014/0380076 A1* | 12/2014 | Weissmann ............. G06F 1/324 713/323 |
| 2015/0143139 A1 | 5/2015 | Kumar et al. |
| 2016/0098078 A1 | 4/2016 | Kumar et al. |
| 2016/0098079 A1 | 4/2016 | Kumar et al. |
| 2016/0103474 A1 | 4/2016 | Kumar et al. |
| 2016/0313785 A1 | 10/2016 | Kumar et al. |

FOREIGN PATENT DOCUMENTS

| | | |
|---|---|---|
| KR | 10-2013-0040485 | 4/2013 |
| KR | 10-2013-0061747 | 6/2013 |
| KR | 10-2013-0097505 | 9/2013 |
| WO | WO 00/67102 | 11/2000 |

* cited by examiner

METHOD OF DYNAMICALLY CONTROLLING POWER IN MULTICORE ENVIRONMENT

CROSS-REFERENCE TO RELATED APPLICATIONS

This application claims priority under 35 U.S.C. §119 to Korean Patent Application No. 10-2013-0153123, filed on Dec. 10, 2013, the disclosure of which is incorporated herein by reference in its entirety.

TECHNICAL FIELD

The present invention relates to a method of dynamically controlling power, and more particularly, to a method of dynamically controlling power in a multicore environment, which dynamically controls power in a multicore environment to save power.

BACKGROUND

It is required to develop a low-power design for satisfying performances of various applications and reducing power consumption, and thus, an importance of a multicore processor is more increasing.

Global processor manufacturers, such as Intel, AMD, etc., are proposing a low-power multicore chip having a high performance, a solution relevant thereto, and products using the same. In particular, NVIDIA, TI, and Qualcomm release products in which a multicore is applied to a high-performance portable terminal, and propose a road map for continuous development.

A low power technique of a core is applied to a single core, but a multicore environment has a limitation in minimizing power of a multicore system by using only the low power technique which is applied to a single core environment. Therefore, it is required to correct and complement the low power technique, which is applied to the single core, so as to be suitable for the multicore.

A low power control method of a multicore analyzes and predicts a usage of a central processing unit (CPU) of a performed task, and adjusts a performance of a core by applying predetermined low power policies, thereby reducing power consumption.

Such a low power technique of the multicore is greatly categorized into a dynamic power shutdown (DFS) technique and a dynamic voltage frequency scaling (DVFS) technique. The DFS technique is a method that automatically turns on/off power of a core depending on a state of the core and a condition of an application, and the DVFS technique is a method that dynamically adjusts a voltage and a frequency of a core. A technique, which adjusts power by using the two techniques, is called a dynamic power management (DPM) technique.

Particularly, in an operating system (OS), power is saved through the frequency control and dynamic voltage control of a CPU.

The DVFS technology was proposed based on a feature of a CMOS power characteristic formula "$P_{dynamic}=CV^2f$" in which dynamic power consumption is proportional to two raised to the power of an operating voltage, and increases in proportion to an operating frequency. Recently, CPUs include a processor core that enables a frequency to be varied to 800 MHz, 1.0 GHz, 1.2 GHz, 1.4 GHz, 1.6 GHz, 1.8 GHz, 2.0 GHz, 2.21 GHz, or 2.71 GHz.

The papers and patents for the DVFS technology were proposed, and the DVFS technology is effective for a single CPU. However, the DVFS technology is not effective for a multicore.

The reason that the DVFS technology is not effective for a multicore is because control for each core is not smooth, and a highest-frequency core and the other cores of a multicore are controlled by the same scheme, causing a reduction in the saving effect of power. The DVFS technology has a difficulty to perform dynamic power-saving control in an actual multicore environment.

As in the software (SW) guideline for Intel processors, since power consumption has a linear relationship with an operating frequency of a processor, it is effective for power consumption that a load in which calculation of the processor is frequently performed is driven at a high frequency, and a load in which the number of calculations is small is driven at a low frequency.

Therefore, in operating a governor for reflecting a power policy, the window OS and the Linux kernel set and control a performance mode that uses the maximum frequency for the maximum performance, a power save mode that uses the lowest frequency for saving power, and an on-demand mode for varying the amounts of power consumption by load, thereby allowing workload-based power policies by load to be used.

However, an on-demand governor method is immediately performed according to a multicore and an input/output load, and for this reason, an amount of power consumption increases.

To summarize the problems of the related art, all cores of a multicore in the same package operate at the same frequency, in which case a frequency is tuned and adjusted according to maximum loads by core. For this reason, the dynamic power-saving effect is not high. In addition, an on-demand governor has a frequency adjusting function for each load, but a frequency is adjusted according to the maximum load in one package, causing the waste of power by a low-load core. Also, since detailed power-saving policies by core and turn-on/off control methods by core are not provided, there is a limitation in saving power.

SUMMARY

Accordingly, the present invention provides a method of dynamically controlling power in a multicore environment, which dynamically controls power in a multicore environment to save power.

In one general aspect, a method of dynamically controlling power in a multicore environment, including a multicore processor which includes a plurality of cores and a scheduler, includes: determining, by the scheduler, whether a management policy is set; when it is determined that the management policy is set, by the scheduler, collecting frequency change information used to change frequencies of the plurality of cores; calculating an average load of each core on a basis of the frequency change information, and calculating an average frequency of each core according to the calculated average load of each core; comparing the average frequency of each core and a predetermined threshold value; and setting a next frequency of each core according to the comparison result.

The setting of a next frequency may include operating the plurality of cores according to the next frequency of each core.

The determining of whether a management policy is set may include, when it is determined that the management policy is not set, by the scheduler, setting a maximum frequency of each core to a next frequency of each core.

The collected frequency change information may include a load of each core, and has a slide window structure.

The comparing may include, when it is determined that the average frequency of each core is less than the threshold value, setting the average frequency of each core to the next frequency of each core.

The comparing may include, when it is determined that the average frequency of each core is equal to or greater than the threshold value, setting a maximum frequency of each core to the next frequency of each core.

The method may further include, after the next frequency is set, determining whether a current task is a CPU-bound task or an I/O-bound task, and setting the next frequency of each core according to the determination result.

The setting of the next frequency may include: when the current task is the CPU-bound task, setting a maximum frequency of each core to the next frequency of each core; and when the current task is the I/O-bound task, setting the average frequency of each core to the next frequency of each core.

In another general aspect, a method of dynamically controlling power in a multicore environment, including a multicore processor which includes a plurality of cores and a scheduler, includes: determining, by the scheduler, whether a management policy is set; when it is determined that the management policy is set, by the scheduler, collecting frequency change information used to change frequencies of the plurality of cores; calculating an average load of each core on a basis of the frequency change information, and calculating an average frequency of each core according to the calculated average load of each core; comparing the average frequency of each core and a predetermined threshold value; when it is determined that the average frequency of each core is less than the threshold value, comparing the average frequency of each core and a core off threshold value, and according to the comparison result, turning off a core or setting the average frequency of each core to a next frequency of each core; and operating the plurality of cores according to the next frequency of each core.

The comparing may include, when it is determined that the average frequency of each core is equal to or greater than the threshold value, setting a maximum frequency of each core to the next frequency of each core.

The method may further include, when the average frequency of each core is less than the core off threshold value, turning off a core having a minimum average load among the plurality of cores.

The method may further include, when the average frequency of each core is equal to or greater than the core off threshold value, setting the average frequency of each core to the next frequency of each core.

A load of the core having the minimum average load among the plurality of cores may be allocated to a core having the second lowest minimum average load among the plurality of cores.

The method may further include, after the next frequency of each core is set, determining whether there is a turned-off core, and if so, turning on a corresponding core.

Other features and aspects will be apparent from the following detailed description, the drawings, and the claims.

DETAILED DESCRIPTION OF EMBODIMENTS

Figure 1:
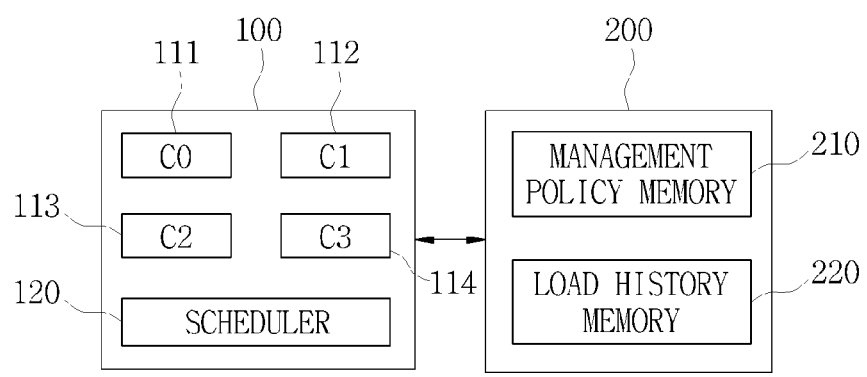
FIG. 1 is a block diagram illustrating a system for dynamically controlling power in a multicore environment according to an embodiment of the present invention.

Hereinafter, embodiments of the present invention will be described in detail to be easily embodied by those skilled in the art with reference to the accompanying drawings. In the drawings, the sizes or shapes of elements may be exaggeratedly illustrated for clarity and convenience of description. Moreover, the terms used henceforth have been defined in consideration of the functions of the present invention, and may be altered according to the intent of a user or operator, or conventional practice. Therefore, the terms should be defined on the basis of the entire content of this specification.

Figure 2:
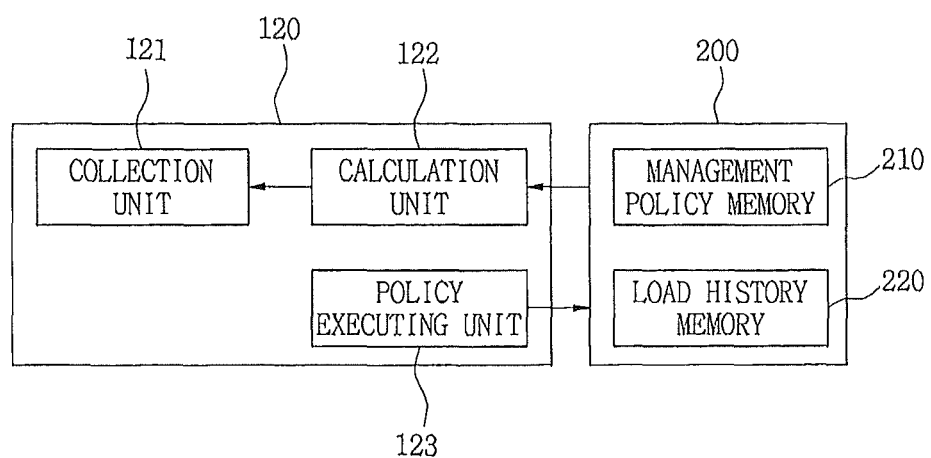
FIG. 2 is a block diagram illustrating a scheduler of a dynamic power control system according to an embodiment of the present invention.

FIG. 1 is a block diagram illustrating a system for dynamically controlling power in a multicore environment according to an embodiment of the present invention. FIG. 2 is a block diagram illustrating a scheduler of a dynamic power control system according to an embodiment of the present invention.

Referring to FIG. 1, a system (hereinafter referred to as a dynamic power control system) for dynamically controlling power in a multicore environment according to an embodiment of the present invention includes a multicore processor 100, which is configured with a plurality of cores 111 to 114 and a scheduler 120, and a memory 200 that stores a management policy and a load history. Here, the memory 200 includes a management policy memory 210 and a load history memory 220.

In the dynamic power control system, when the management policy is set, the scheduler 120 dynamically changes frequencies of the cores 111 to 114 according to the management policy on the basis of the load history, thereby saving power.

In this case, the scheduler 120 dynamically changes the frequencies of the cores 111 to 114 according to the usages of the cores 111 to 114, and the cores 111 to 114 operate according to the changed frequencies.

As illustrated in FIG. 2, the scheduler 120 includes a collection unit 121, a calculation unit 122, and a policy executing unit 123.

The collection unit 121 collects frequency change information used to change the frequencies of the cores 111 to 114, and collects loads by core and a total amount of used power.

Moreover, the collection unit 121 may collect an amount of power (i.e., an amount of energy consumption), which is consumed during a certain period, from a performance monitoring unit (PMU), and collect cycles per instruction (CPI) in addition to the amount of energy consumption.

The frequency change information collected by the collection unit 121 is stored in the load history memory 220.

The calculation unit 122 calculates an average load of each core on the basis of the management policy stored in the management policy memory 210 and the frequency change information collected by the collection unit 121, and calculates an average frequency of each core according to the calculated average load of each core.

In this case, the calculation unit 122 calculates the average load of each core and the average frequency of each core by using the frequency change information stored in the load history memory 220.

The policy executing unit 123 sets a next frequency of each core on the basis of the average frequency of each core calculated by the calculation unit 122, and controls the cores 111 to 114 in order for the cores 111 to 114 to operate according to the set frequency.

In this case, the policy executing unit 123 compares the core average frequency with a predetermined threshold value, and controls operations of the cores 111 to 114 according to a core off threshold value and the pattern of a current task based on the comparison result.

A control method of the system 1 (which includes the collection unit 121, the calculation unit 122, and the policy executing unit 123 as described above) for dynamically controlling power in the multicore environment will be described below in detail with reference to FIGS. 2 and 3.

Figure 3A:
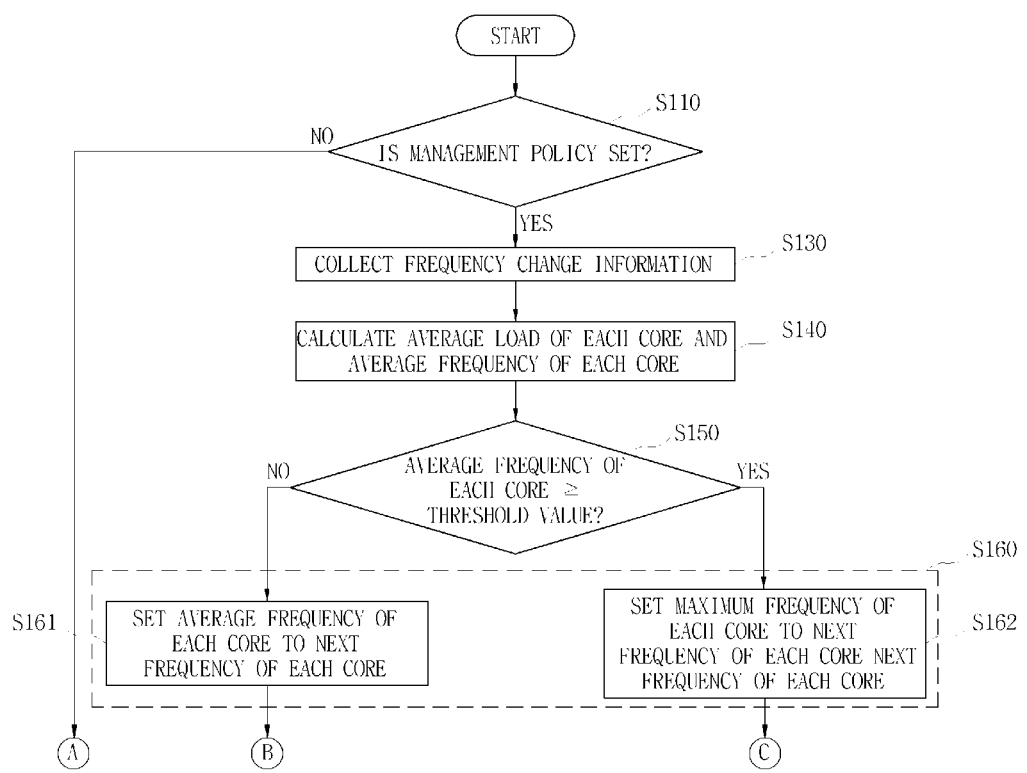
FIGS. 3A and 3B is a flowchart for describing a method of dynamically controlling power in a multicore environment according to a first embodiment of the present invention.
Figure 3B:
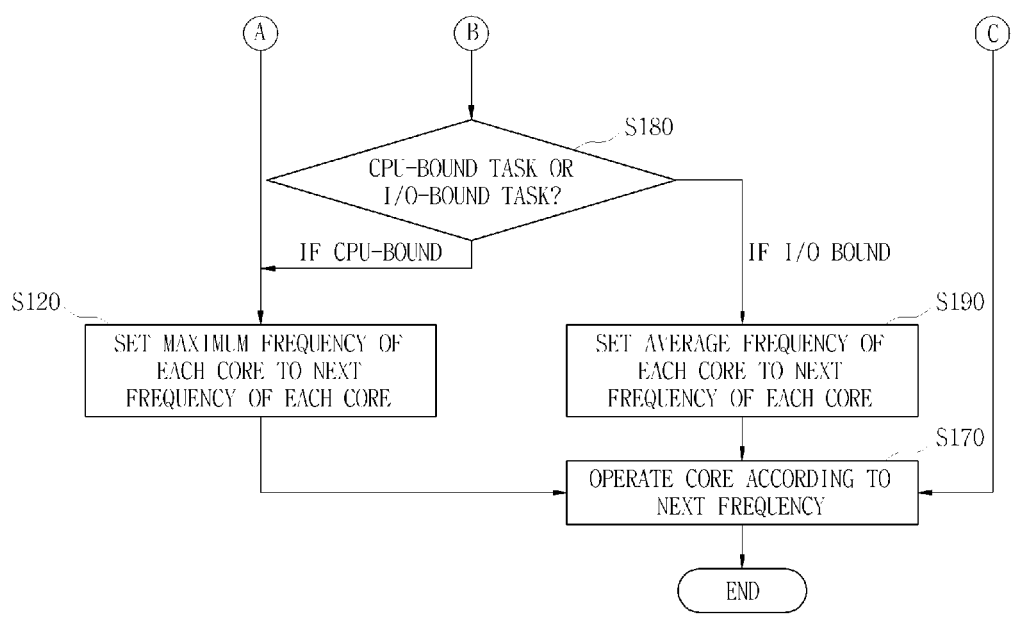

FIGS. 3A and 3B is a flowchart for describing a method of dynamically controlling power in a multicore environment according to a first embodiment of the present invention.

Referring to FIGS. 3A and 3B, when the dynamic power control system according to the present invention is executed, the dynamic power control system determines whether a management policy is set in operation S110. In this case, the scheduler 120 searches the management policy memory 210 to determine whether the management policy is set.

When it is determined in operation S110 that the management policy is not set, the scheduler 120 sets the maximum frequency of each core to a next frequency of each core, in operation S120.

When it is determined in operation S110 that the management policy is set, the scheduler 120 collects information (hereinafter referred to as frequency change information) used to change the frequencies of the cores 111 to 114, in operation S130. Here, the frequency change information may include loads by core and a total amount of used power, and in addition, may include an amount of energy consumption and CPI.

The frequency change information, which is collected in operation S130, is stored in a slide window structure, and is stored in a slide window record.

Subsequent to operation S130, the dynamic power control system calculates an average load of each core on the basis of the collected frequency change information, and calculates an average frequency of each core according to the calculated average load of each core, in operation S140. In this case, the average load of each core may be calculated by various schemes, and for example, may be calculated according to an arithmetic average calculation scheme, a harmonic average calculation scheme, or a median calculation scheme.

When the average load "$L_{avg}$" of each core is calculated according to the arithmetic average calculation scheme, the average load "$L_{avg}$" of each core may be expressed as the following Equation (1) or Equation (2):

$$L_{avg} = \sum_{i=0}^{m} \frac{L_{avg}(R_i)}{m} \quad (1)$$

where $L_{avg}(R_i)$ denotes an average load of each core when the number of slide window records is one, and m is the number of records. $L_{avg}(R_i)$ is expressed as $(S_{window}-T_{idle})/S_{window}$, where $R_i$ denotes an ith record, $S_{window}$ denotes a size of a slide window, and $T_{idle}$ denotes an idle time.

$$L_{avg}=[L_{avg}(R_m)+(L_{avg_{current}} \times m)-L_{avg}(R_0)]/m \quad (2)$$

where $L_{avg}(R_m)$ denotes an average load of an mth record, $L_{avg_{current}}$ denotes a current average load, and $L_{avg}(R_0)$ denotes an average load of a zeroth record.

When the average load "$L_{avg}$" of each core is calculated according to the harmonic average calculation scheme, the average load "$L_{avg}$" of each core may be expressed as the following Equation (3):

$$L_{avg} = 1 / \left( \left( \sum_{i=0}^{m} \frac{1}{L_{avg}(R_i)} \right) / m \right) \quad (3)$$

When the average load "$L_{avg}$" of each core is calculated according to the median calculation scheme, the average load "$L_{avg}$" of each core may be expressed as the following Equation (4):

$$L_{avg}=\text{Median}(L_{avg}(R_i)) \quad (4)$$

The average frequency "$f_{avg}$" of each core may be calculated based on the average load "$L_{avg}$" of each core expressed as Equations (1) to (4), and may be expressed as the following Equation (5):

$$f_{avg}=f_{min}+(f_{max}-f_{min}) \times L_{avg} \quad (5)$$

where $f_{min}$ denotes the minimum frequency of each core, and $f_{max}$ denotes the maximum frequency of each core.

Subsequent to operation S140, the dynamic power control system compares the calculated average frequency "$f_{avg}$" of each core and a predetermined threshold value, in operation S150.

Then, the dynamic power control system sets a next frequency of each core according to the comparison result, in operation S160.

When it is determined in operation S150 that the calculated average frequency of each core is less than the threshold value, the dynamic power control system sets the average frequency of each core to the next frequency of each core, in operation S161.

On the other hand, when it is determined in operation S150 that the calculated average frequency of each core is equal to or greater than the threshold value, the dynamic power control system sets the maximum frequency of each core to the next frequency of each core, in operation S162.

Subsequently, in operation S170, the dynamic power control system operates the plurality of cores according to the next frequency of each core which is set in operation S160.

As described above, by applying the method of dynamically controlling power according to the present invention to the multicore environment, a next operating frequency is calculated according to an average load for each core, and each core operates according to the calculated frequency, thereby enabling a frequency to be set to be suitable for each core. Accordingly, each core is prevented from operating at an undesired high frequency, thereby reducing power consumption.

In addition, the dynamic power control method according to the present invention may further include task determining operation S180 that determines whether a current task is a CPU-bound task or an I/O-bound task, and sets a next frequency of each core according to the determination result.

In detail, in a case of the CPU-bound task, quick processing is efficient. Therefore, the dynamic power control system sets the maximum frequency of each core to the next frequency of each core, in operation S120. When the current task is the I/O-bound task, the dynamic power control system sets the average frequency of each core to the next frequency of each core in operation S190, and performs operation S170 that operates the plurality of cores according to the next frequency of each core.

Therefore, in setting a next frequency of each core, the saving effect of user power can increase by additionally performing a setting operation based on the pattern of a task.

Figure 4A:
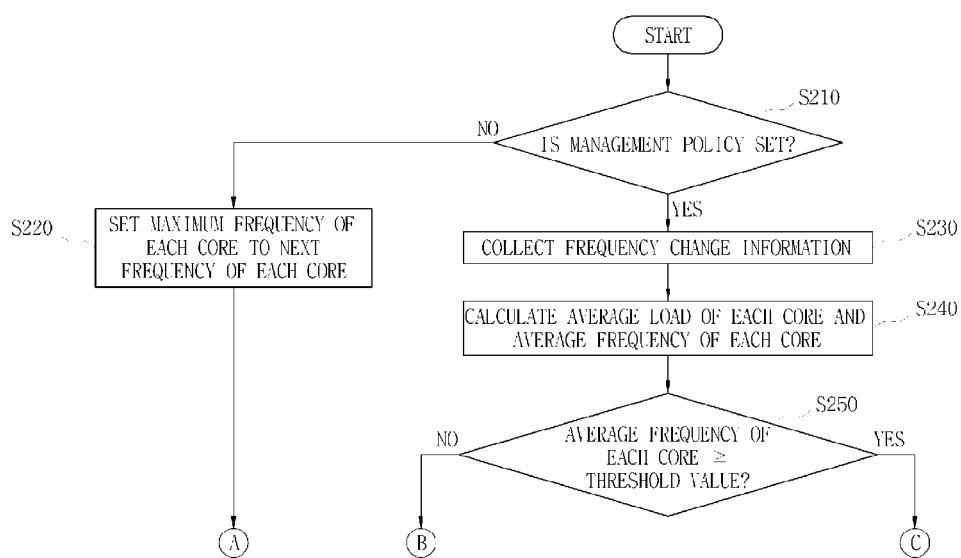
FIGS. 4A and 4B is a flowchart for describing a method of dynamically controlling power in a multicore environment according to a second embodiment of the present invention.
Figure 4B:
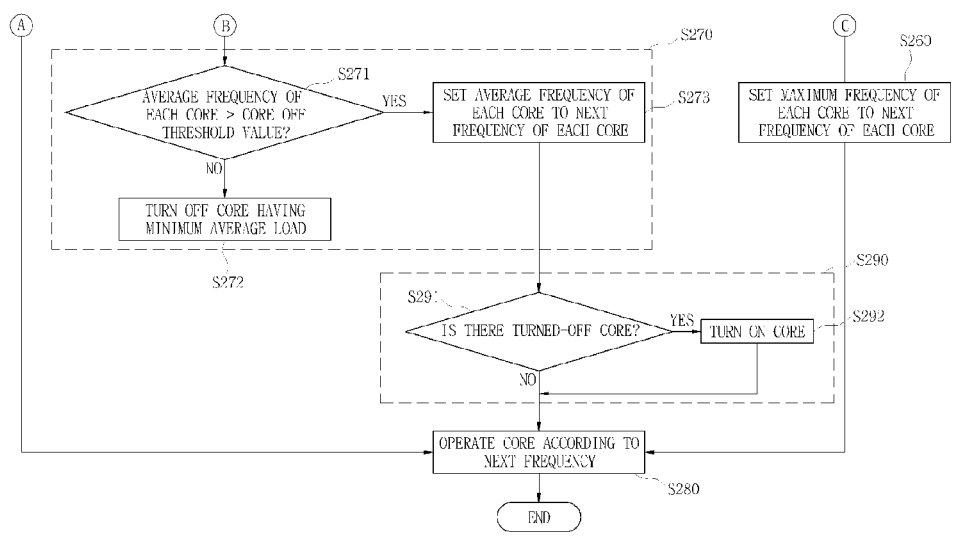

FIGS. 4A and 4B is a flowchart for describing a method of dynamically controlling power in a multicore environment according to a second embodiment of the present invention.

Referring to FIGS. 4A and 4B, when the dynamic power control system according to the present invention is executed, the dynamic power control system determines whether a management policy is set in operation S210.

In this case, the scheduler 120 searches the management policy memory 210 to determine whether the management policy is set.

When it is determined in operation S210 that the management policy is not set, the scheduler 120 sets the maximum frequency of each core to a next frequency of each core, in operation S220.

When it is determined in operation S210 that the management policy is set, the scheduler 120 collects information (hereinafter referred to as frequency change information) used to change the frequencies of the cores 111 to 114, in operation S230. Here, the frequency change information may include loads by core and a total amount of used power, and in addition, may include an amount of energy consumption and CPI.

The frequency change information, which is collected in operation S230, is stored in a slide window structure, and is stored in a slide window record.

Subsequent to operation S230, the dynamic power control system calculates an average load of each core on the basis of the collected frequency change information, and calculates an average frequency of each core according to the calculated average load of each core, in operation S240.

In this case, the average load "$L_{avg}$" of each core may be calculated as expressed in Equations (1) to (4), and the average frequency "$f_{avg}$" of each core may be calculated as expressed in Equation (5).

Subsequent to operation S240, the dynamic power control system compares the calculated average frequency "$f_{avg}$" of each core and a predetermined threshold value, in operation S250.

When it is determined in operation S250 that the calculated average frequency "$f_{avg}$" of each core is equal to or greater than the threshold value, the dynamic power control system sets the maximum frequency of each core to a next frequency of each core, in operation S260.

When it is determined in operation S250 that the calculated average frequency "$f_{avg}$" of each core is less than the threshold value, the dynamic power control system compares the average frequency of each core and a core off threshold value, in operation S271. On the basis of the comparison result, the dynamic power control system turns off a core in operation S272, or sets the average frequency of each core to the next frequency of each core in operation S273. Here, operation S270 of determining turn-off of each core includes operations S271 to S273.

When the average frequency of each core is less than the core off threshold value, the dynamic power control system performs operation S272 that turns off a core having the minimum average load among the plurality of cores, and when the average frequency of each core is equal to or greater than the core off threshold value, the dynamic power control system sets the average frequency of each core to the next frequency of each core in operation S273.

In operation S272, a load of a core having the minimum average load among the plurality of cores is allocated to a core having the second lowest minimum average load after the minimum average load among the plurality of cores.

Subsequently, in operation S280, the dynamic power control system operates the plurality of cores according to the next frequency of each core which is set in preceding operation.

Subsequent to operation S273, the dynamic power control system determines whether there is a turned-off core, in operation S291. When there is the turned-off core, the dynamic power control system turns on a corresponding core, in operation S292. Operation S290 including operations S291 and S292 are performed, and then, operation S280 is performed.

Hereinabove, by comparing an average frequency of each core and the core off threshold value, a core having the minimum average load is turned off, and thus, it can be expected to more effectively save power.

As described above, by applying the method of dynamically controlling power according to the present invention to the multicore environment, a next operating frequency is calculated according to an average load for each core, and each core operates according to the calculated frequency, thereby enabling a frequency to be set to be suitable for each core. Accordingly, each core is prevented from operating at an undesired high frequency, thereby reducing power consumption.

Moreover, in setting a next frequency of each core, the saving effect of user power can increase by additionally performing a setting operation based on the pattern of a task.

Moreover, by comparing an average frequency of each core and the core off threshold value, a core having the minimum average load is turned off, and thus, it can be expected to more effectively save power.

The method of dynamically controlling power in the multicore environment has been described according to the embodiments, but the scope of the present invention is not limited to a specific embodiment. The present invention may be corrected and modified within the technical scope obvious to those skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of dynamically controlling power in a multicore environment including a multicore processor which includes a plurality of cores and a scheduler, the method comprising:

determining, by the scheduler, whether a management policy is set;

collecting frequency change information used to change frequencies of the plurality of cores when the management policy is determined to be set by the scheduler;

calculating an average load of each core based on the collected frequency change information;

calculating an average frequency of each core according to the calculated average load of each core;

comparing the calculated average frequency of each core and a threshold frequency; and setting a first next frequency of each core according to a result of the comparing;

determining whether a current task is a CPU-bound task or an I/O-bound task; and setting a second next frequency of each core according to a result of the determining, wherein the setting of a first next frequency comprises:
when it is determined that the current task is the CPU-bound task, setting a maximum frequency of each core as the second next frequency of each core; and
when it is determined that the current task is the I/O-bound task, setting the average frequency of each core to as the second next frequency of each core.

2. The method of claim 1, wherein the setting of a first next frequency comprises operating the plurality of cores according to the first next frequency of each core.

3. The method of claim 1, wherein the determining of whether a management policy is set comprises, when the management policy is determined to be not set, by the scheduler, setting a maximum frequency of each core as the first next frequency of each core.

4. The method of claim 1, wherein the collected frequency change information comprises a load of each core, and has a slide window structure.

5. The method of claim 1, wherein the comparing comprises, when the average frequency of each core is determined to be less than the threshold frequency, setting the average frequency of each core as the first next frequency of each core.

6. The method of claim 1, wherein the comparing comprises, when the average frequency of each core is determined to be equal to or greater than the threshold frequency, setting a maximum frequency of each core as the first next frequency of each core.

7. The method of claim 1, wherein in the calculating of an average load of each core, the average load of each core is expressed as Equations (1) to (4) below:

$$L_{avg} = \sum_{i=0}^{m} \frac{L_{avg}(R_i)}{m} \quad (1)$$

where Lavg(Ri) denotes an average load of each core when number of slide window records is one, and m is number of records. Lavg(Ri) is expressed as (Swindow−Tidle)/Swindow, where Ri denotes an ith record, Swindow denotes a size of a slide window, and Tidle denotes an idle time, $$L_{avg} = [L_{avg}(R_m) + (L_{avg_{current}} \times m) - L_{avg}(R_0)]/m \quad (2)$$

$$L_{avg} = 1 \bigg/ \left(\left(\sum_{i=0}^{m} \frac{1}{L_{avg}(R_i)}\right) \bigg/ m\right) \quad (3)$$

$$L_{avg} = \operatorname{Median}(L_{avg}(R_i)) \quad (4)$$

where Lavg(Rm) denotes an average load of an mth record, $L_{avg_{current}}$ denotes a current average load, and Lavg(R0) denotes an average load of a zeroth record.

8. The method of claim 7, wherein in the calculating of an average load of each core, the average frequency of each core is expressed as Equation (5) below:

$$f_{avg} = f_{min} + (f_{max} - f_{min}) \times L_{avg} \quad (5)$$

where fmin denotes a minimum frequency of each core, and fmax denotes a maximum frequency of each core.

9. A method of dynamically controlling power in a multicore environment including a multicore processor which includes a plurality of cores and a scheduler, the method comprising:

determining, by the scheduler, whether a management policy is set;

when the management policy is determined to be set by the scheduler, collecting frequency change information used to change frequencies of the plurality of cores;

calculating an average load of each core based on the collected frequency change information;

calculating an average frequency of each core according to the calculated average load of each core;

comparing the calculated average frequency of each core and a threshold frequency;

when the calculated average frequency of each core is determined to be less than the threshold frequency, comparing the calculated average frequency of each core and a core off threshold frequency;

performing one of turning off a core or setting the calculated average frequency of each core as a first next frequency of each core according a result of the comparing of the calculated average frequency of each core and a threshold frequency;

operating the plurality of cores according to the first next frequency of each core; and when the calculated average frequency of each core is determined to be less than the core off threshold frequency, turning off a core having a minimum average load among the plurality of cores, wherein a load of the core having the minimum average load among the plurality of cores is allocated to a core having the second lowest minimum average load after the minimum average load among the plurality of cores.

10. The method of claim 9, wherein the comparing comprises, when the calculated average frequency of each core is determined to be equal to or greater than the threshold frequency, setting a maximum frequency of each core as the first next frequency of each core.

11. The method of claim 9, further comprising, when the calculated average frequency of each core is equal to or greater than the core off threshold frequency, setting the calculated average frequency of each core as the first next frequency of each core.

12. The method of claim 11, further comprising, after the first next frequency of each core is set, determining whether there is a turned-off core, and when there is the turned-off core, turning on a corresponding core.

13. The method of claim 9, wherein in the calculating of an average load of each core, the average load of each core is expressed as Equations (1) to (4) below:

$$L_{avg} = \sum_{i=0}^{m} \frac{L_{avg}(R_i)}{m} \quad (1)$$

where Lavg(Ri) denotes an average load of each core when number of slide window records is one, and m is number of records, Lavg(Ri) is expressed as (Swindow−Tidle)/Swindow, where Ri denotes an ith record, Swindow denotes a size of a slide window, and Tidle denotes an idle time, $$L_{avg} = [L_{avg}(R_m) + (L_{avg_{current}} \times m) - L_{avg}(R_0)]/m \quad (2)$$

$$L_{avg} = 1 \bigg/ \left( \sum_{i=0}^{m} \frac{1}{L_{avg}(R_i)} \right) \bigg/ m \quad (3)$$

$$L_{avg} = \mathrm{Median}(L_{avg}(R_i)) \quad (4)$$

where Lavg(Rm) denotes an average load of an mth record, $L_{avg_{current}}$ denotes a current average load, and Lavg(R0) denotes an average load of a zeroth record.

14. The method of claim 13, wherein in the calculating of an average frequency of each core, the average frequency of each core is expressed as Equation (5) below:

$$f_{avg} = f_{min} + (f_{max} - f_{min}) \times L_{avg} \quad (5)$$

where fmin denotes a minimum frequency of each core, and fmax denotes a maximum frequency of each core.

* * * * *